(12) United States Patent
Inaba et al.

(10) Patent No.: US 7,689,080 B2
(45) Date of Patent: Mar. 30, 2010

(54) OPTICAL FIBER RIBBON

(75) Inventors: Harumi Inaba, Tokyo (JP); Ryuichi Sugizaki, Tokyo (JP); Takeshi Yagi, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 10 days.

(21) Appl. No.: 12/115,877

(22) Filed: May 6, 2008

(65) Prior Publication Data

US 2008/0232750 A1   Sep. 25, 2008

Related U.S. Application Data

(63) Continuation of application No. PCT/JP2007/069376, filed on Oct. 3, 2007.

(30) Foreign Application Priority Data

Oct. 3, 2006   (JP) .............................. 2006-271618

(51) Int. Cl.
G02B 6/44   (2006.01)

(52) U.S. Cl. ...................... 385/114; 385/102

(58) Field of Classification Search ................. 385/100, 385/114

See application file for complete search history.

(56) References Cited

U.S. PATENT DOCUMENTS

| | | | | |
|---|---|---|---|---|
| 5,373,578 A | * | 12/1994 | Parker et al. | 385/128 |
| 5,416,880 A | * | 5/1995 | Edwards et al. | 385/128 |
| 5,457,762 A | * | 10/1995 | Lochkovic et al. | 385/114 |
| 5,717,805 A | * | 2/1998 | Stulpin | 385/114 |
| 5,761,363 A | * | 6/1998 | Mills | 385/114 |
| 5,949,940 A | * | 9/1999 | Botelho et al. | 385/114 |
| 5,982,968 A | * | 11/1999 | Stulpin | 385/114 |
| 6,097,866 A | * | 8/2000 | Yang et al. | 385/114 |
| 6,134,364 A | * | 10/2000 | DeFabritis et al. | 385/114 |
| 6,222,969 B1 | * | 4/2001 | Botelho et al. | 385/114 |
| 6,243,523 B1 | * | 6/2001 | Aloisio et al. | 385/128 |
| 6,253,013 B1 | * | 6/2001 | Lochkovic et al. | 385/114 |

(Continued)

FOREIGN PATENT DOCUMENTS

EP   1 628 149 A1   2/2006

(Continued)

OTHER PUBLICATIONS

K. Ohtsuka, et al., "Development of Multi-Fiber Optical Connector using High-Density Optical Circuit", The Institute of Electronics, Information and Communication Engineers, 2003 Nen, Sogo Taikai Koen Ronbunshu Electronics 1, Mar. 3, 2003, p. 158 (lecture No. C-3-18).

*Primary Examiner*—Frank G Font
*Assistant Examiner*—Peter Radkowski
(74) *Attorney, Agent, or Firm*—Oblon, Spivak, McClelland, Maier & Neustadt, L.L.P.

(57) ABSTRACT

An optical fiber ribbon includes a plurality of optical fibers, each includes a glass optical fiber coated with a fiber coating, that are arranged in parallel, and a ribbon coating that coats the optical fibers arranged in parallel. The optical fiber ribbon has a thickness equal to 300 μm or less. The fiber coating is made of a non-flame-resistant ultraviolet curable resin. The ribbon coating has a thickness equal to 40 μm or more and is made of a flame resistant resin.

15 Claims, 5 Drawing Sheets

U.S. PATENT DOCUMENTS

| | | | |
|---|---|---|---|
| 6,535,673 B1* | 3/2003 | Lochkovic | 385/114 |
| 6,565,685 B2* | 5/2003 | Unterberger et al. | 156/180 |
| 6,584,263 B2* | 6/2003 | Fewkes et al. | 385/128 |
| 6,600,859 B2* | 7/2003 | Chandraiah et al. | 385/114 |
| 6,678,449 B2* | 1/2004 | Thompson et al. | 385/114 |
| 6,859,600 B2* | 2/2005 | Khudyakov et al. | 385/128 |
| 6,887,918 B2* | 5/2005 | Khudyakov et al. | 522/96 |
| 6,895,156 B2* | 5/2005 | Walker et al. | 385/128 |
| 6,904,210 B2* | 6/2005 | Chandraiah et al. | 385/114 |
| 6,973,245 B2* | 12/2005 | Bocanegra et al. | 385/102 |
| 7,050,688 B2* | 5/2006 | Lochkovic et al. | 385/128 |
| 7,067,564 B2* | 6/2006 | Bulters et al. | 522/96 |
| 7,214,431 B2* | 5/2007 | Komiya et al. | 428/411.1 |
| 7,257,299 B2* | 8/2007 | Chien et al. | 385/114 |
| 7,274,846 B1* | 9/2007 | Paap et al. | 385/114 |
| 2001/0008906 A1* | 7/2001 | Chawla | 522/90 |
| 2002/0102086 A1* | 8/2002 | Fewkes et al. | 385/128 |
| 2003/0002831 A1* | 1/2003 | Chandraiah et al. | 385/114 |
| 2003/0016924 A1* | 1/2003 | Thompson et al. | 385/114 |
| 2003/0044141 A1* | 3/2003 | Melton et al. | 385/128 |
| 2003/0147613 A1* | 8/2003 | Khudyakov et al. | 385/128 |
| 2003/0176522 A1* | 9/2003 | Komiya et al. | 522/71 |
| 2003/0223718 A1* | 12/2003 | Khudyakov et al. | 385/128 |
| 2004/0052483 A1* | 3/2004 | Chandraiah et al. | 385/114 |
| 2004/0213531 A1 | 10/2004 | Sasaoka | |
| 2005/0013573 A1* | 1/2005 | Lochkovic et al. | 385/128 |
| 2005/0141831 A1* | 6/2005 | Bocanegra et al. | 385/100 |
| 2005/0158000 A1* | 7/2005 | Szum et al. | 385/128 |
| 2005/0184411 A1* | 8/2005 | Konstadinidis et al. | 264/1.27 |
| 2006/0034575 A1* | 2/2006 | Sako et al. | 385/127 |
| 2007/0147756 A1 | 6/2007 | Matsuo et al. | |
| 2007/0196059 A1* | 8/2007 | Kojima | 385/100 |

FOREIGN PATENT DOCUMENTS

| | | |
|---|---|---|
| EP | 1 862 825 A1 | 12/2007 |
| JP | 01-295207 A | 11/1989 |
| JP | 5-96811 | 12/1993 |
| JP | 2002-214492 A | 7/2002 |
| JP | 2002214492 A * | 7/2002 |
| JP | 2003-279780 A | 10/2003 |
| JP | 2004-12616 A | 1/2004 |
| JP | 2005-8448 A | 1/2005 |
| JP | 2005-326567 A | 11/2005 |
| WO | WO 2006/025231 A1 | 3/2006 |
| WO | WO 2006/101204 A1 | 9/2006 |

\* cited by examiner

| | OPTICAL FIBER CHARACTERISTICS | | | | | | OPTICAL FIBER RIBBON CHARACTERISTICS | | | | | TEST | | |
|---|---|---|---|---|---|---|---|---|---|---|---|---|---|---|
| | OPTICAL FIBER OUTER DIAMETER | FIBER COATING | | | | | RIBBON THICKNESS | PITCH | RIBBON COATING | | TOTAL THICKNESS OF FLAME RESISTANT COATINGS | FLAME RESISTANCE | SCREENING | INSTALLATION EFFICIENCY |
| | | PRIMARY | | SECONDARY | | | | | | | | | | |
| | | MATERIAL | OUTER DIAMETER | MATERIAL | OUTER DIAMETER | THICKNESS | | | MATERIAL | THICKNESS | | | | |
| UNIT | μm | | μm | | μm | μm | μm | μm | | μm | μm | | | |
| EXAMPLE 1 | 80 | - | - | UV | 100 | 10 | 200 | 100 | FLAME RESISTANT | 50 | 50 | FLAME RESISTANT | FAVORABLE | FAVORABLE |
| EXAMPLE 2 | 80 | - | - | UV | 100 | 10 | 200 | 125 | FLAME RESISTANT | 50 | 50 | FLAME RESISTANT | FAVORABLE | FAVORABLE |
| EXAMPLE 3 | 125 | UV | 195 | FLAME RESISTANT | 250 | 62.5 | 300 | 250 | FLAME RESISTANT | 25 | 52.5 | FLAME RESISTANT | FAVORABLE | FAVORABLE |
| COMPARATIVE EXAMPLE 1 | 80 | UV | 105 | FLAME RESISTANT | 125 | 22.5 | 200 | 125 | FLAME RESISTANT | 37.5 | 47.5 | FLAME RESISTANT | UNFAVORABLE | FAVORABLE |
| COMPARATIVE EXAMPLE 2 | 80 | UV | 105 | UV | 125 | 22.5 | 200 | 125 | FLAME RESISTANT | 37.5 | 37.5 | FLAME RESISTANT | FAVORABLE | FAVORABLE |
| COMPARATIVE EXAMPLE 3 | 125 | UV | 195 | UV | 250 | 62.5 | 300 | 250 | FLAME RESISTANT | 25 | 25 | FLAME RESISTANT | FAVORABLE | FAVORABLE |
| COMPARATIVE EXAMPLE 4 | 125 | UV | 195 | UV | 250 | 62.5 | 400 | 250 | FLAME RESISTANT | 75 | 75 | FLAME RESISTANT | FAVORABLE | UNFAVORABLE |

OPTICAL FIBER RIBBON

CROSS-REFERENCE TO RELATED APPLICATIONS

This application is a continuation of PCT/JP2007/069376 filed on Oct. 3, 2007, the entire content of which are incorporated herein by reference.

BACKGROUND OF THE INVENTION

1. Field of the Invention

The present invention relates to a flame resistant optical fiber ribbon.

2. Description of the Related Art

In recent years, an optical interconnection system using optical fibers for wiring has been attracting attention as a technology for sending a signal in a transmission device. Usually, such optical fibers are used in a form of an optical fiber ribbon. An optical fiber ribbon is formed by arranging in parallel optical fibers, each obtained by forming a fiber coating made of, for example, an ultraviolet curable resin around the circumference of a glass optical fiber, and then coating the optical fibers at the same time with a ribbon coating made of, for example, an ultraviolet curable resin. A conventional optical fiber ribbon used for the optical interconnection system is formed by, for example, arranging in parallel 12 optical fibers, each having an outer diameter of 250 µm and obtained by forming a fiber coating including a primary layer and a secondary layer on the circumference of a glass optical fiber having an outer diameter of, for example, 125 µm, at a pitch of 250 µm and then integrating the optical fibers with a ribbon coating. The conventional fiber ribbon has a thickness of about 300 µm and a width of about 3.1 mm.

To improve efficiency in installing wiring of this type of optical fibers in a transmission device, techniques for reducing the diameter of an optical fiber and the thickness of an optical fiber ribbon are under development. In addition, there has been an increasing demand for flame resistance as one characteristic of this kind of optical fiber ribbon. For example, US Patent Application No. 2006/0034575 discloses an optical fiber ribbon coated with a ribbon coating of flame resistant ultraviolet curable resin.

However, if a fiber coating and a ribbon coating are formed thinner to reduce the diameter of an optical fiber and the thickness of an optical fiber ribbon, favorable flame resistance and screening characteristics cannot be obtained.

SUMMARY OF THE INVENTION

It is an object of the present invention to at least partially solve the problems in the conventional technology.

According to an aspect of the present invention, there is provided an optical fiber ribbon including a plurality of optical fibers, each includes a glass optical fiber coated with a fiber coating, that are arranged in parallel; and a ribbon coating that coats the optical fibers arranged in parallel. The optical fiber ribbon has a thickness equal to 300 µm or less. The fiber coating is made of a non-flame-resistant ultraviolet curable resin. The ribbon coating has a thickness equal to 40 µm or more and is made of a flame resistant resin.

According to another aspect of the present invention, there is provided an optical fiber ribbon including a plurality of optical fibers, each includes a glass optical fiber coated with a fiber coating, that are arranged in parallel; and a ribbon coating that coats the optical fibers arranged in parallel. The optical fiber ribbon has a thickness equal to 300 µm or less. The fiber coating has a thickness equal to 30 µm or more, and includes a non-flame-resistant layer that is made of a non-flame-resistant ultraviolet curable resin and is adjacent to the glass optical fiber and a flame resistant layer that is formed as an outermost layer and is made of a flame resistant resin containing flame resistant agent. The ribbon coating is made of a flame resistant resin. A total thickness of the flame resistant layer and the ribbon coating is equal to 40 µm or more.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
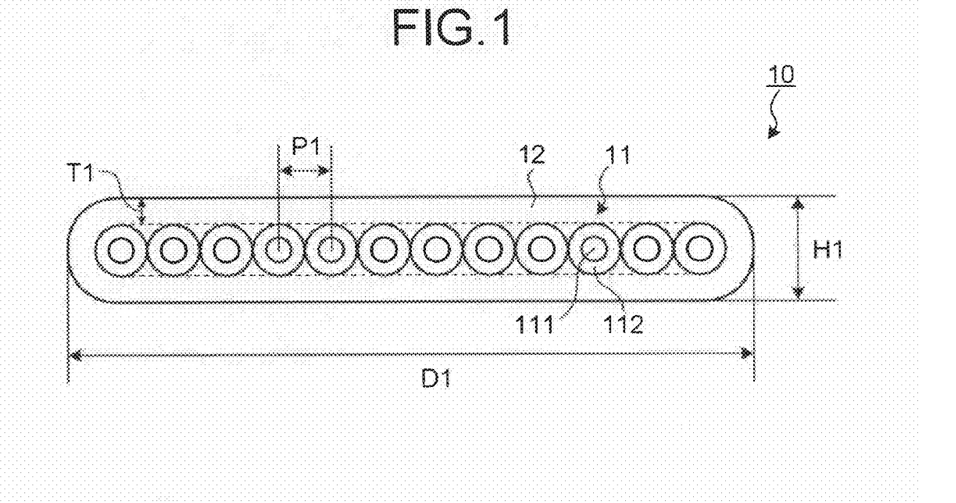
FIG. 1 is a schematic cross section of an optical fiber ribbon according to a first embodiment of the present invention.

FIG. 1 is a schematic cross section of an optical fiber ribbon 10 according to a first embodiment of the present invention. The optical fiber ribbon 10 is formed by arranging 12 optical fibers 11, each obtained by forming a single layer of fiber coating 112 on the circumference of a glass optical fiber 111, and integrating the optical fibers 11 with a ribbon coating 12.

Figure 2:
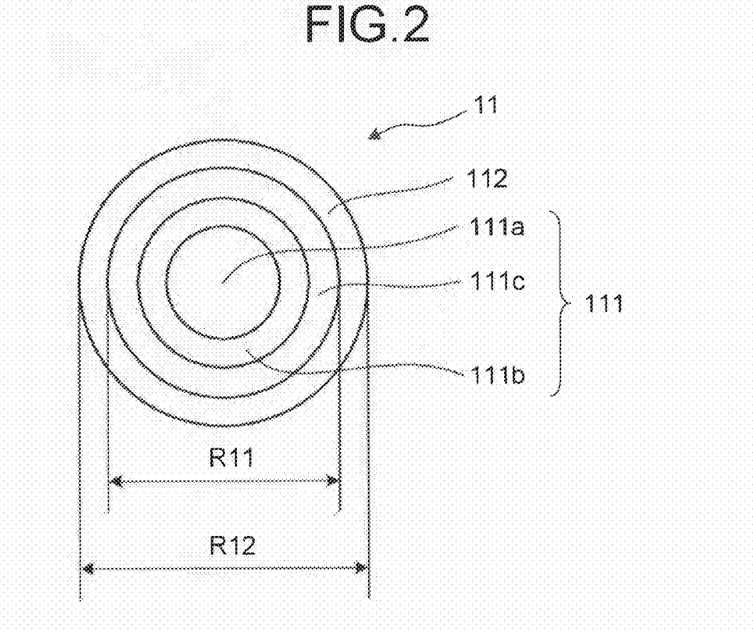
FIG. 2 is a cross section of an optical fiber shown in FIG. 1.

FIG. 2 is a cross section of the optical fiber 11. The glass optical fiber 111 has an outer diameter R11 of 55 µm to 90 µm smaller than that of a typical optical fiber, i.e., 125 µm. In other words, the outer diameter of the glass optical fiber 111 is reduced to the extent that transmission loss does not increase while installation efficiency improves and possibility of damage in the optical fiber due to bending decreases. The glass optical fiber 111 is explained below.

The fiber coating 112 has a Young's modulus of 40 kgf to 200 kgf, and is made of a non-flame-resistant ultraviolet curable resin not containing flame resistant agent. This protects the glass optical fiber 111 from external damage and prevents microbending loss as well as achieving favorable screening characteristics. Furthermore, because the glass optical fiber 111 has a small diameter and the fiber coating 112 is a single layer coating, a diameter R12 of the optical fiber 11 is smaller than that of the conventional one, which ensures a small thickness of the optical fiber ribbon 10.

The ribbon coating 12 is made of an ultraviolet curable urethane acrylate resin containing aluminum hydroxide as flame resistant agent, and has a thickness T1 equal to 40 µm or more. Thus, favorable flame resistance can be achieved.

The optical fiber ribbon 10 has a small thickness H1 equal to 300 μm or less. A pitch P1 between the optical fibers 11 is smaller than that of the conventional ones. This increases flexibility of wiring and installation efficiency in a transmission device while allowing the optical fiber ribbon 10 to have a width D1 smaller than that of the conventional one. Thus, space saving can be achieved.

Figure 3:
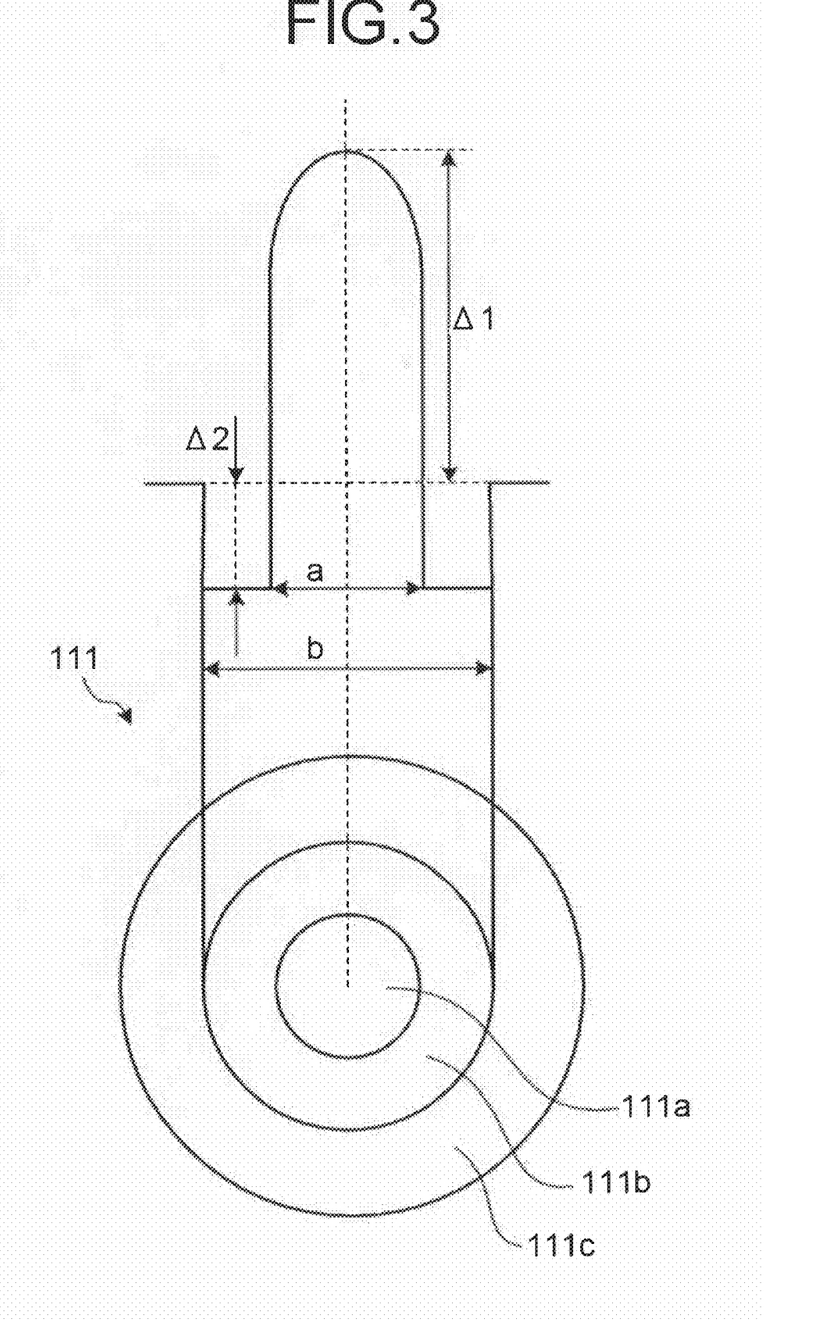
FIG. 3 is a schematic diagram of a refractive-index profile corresponding to the cross section of the optical fiber shown in FIG. 2.

FIG. 3 is a schematic diagram of a refractive-index profile corresponding to the cross section of the glass optical fiber 111. As shown in FIG. 3, the glass optical fiber 111 includes a center core 111a, a depressed core layer 111b formed around the center core 111a, and a cladding layer 111c formed around the depressed core layer 111b. The depressed core layer 111b has a refractive index lower than that of the center core 111a. The cladding layer 111c has a refractive index lower than that of the center core 111a and higher than that of the depressed core layer 111b. In other words, the glass optical fiber 111 has a W-shaped refractive-index profile.

The cladding layer 111c is made of pure silica not containing a dopant for adjusting the refractive index. As shown in FIG. 3, provided that Δ1 denotes a refractive index difference of the center core 111a from the cladding layer 111c, α denotes an α value that is a parameter representing a refractive-index distribution of the center core 111a, Δ2 denotes a refractive index difference of the depressed core layer 111b from the cladding layer 111c, a denotes the diameter of the center core 111a, and b denotes the outer diameter of the depressed core layer 111b, Δ1 is 0.8%, α is 8.0, and Δ2 is −0.5%. The diameter a of the center core 111a is 7.2 μm, and the outer diameter b of the depressed core layer 111b is 12.0 μm.

With the above refractive-index profile, the optical fiber 11 has a mode field diameter of 5.8 μm at a wavelength of 1310 nm of a signal light source used for signal transmission in a transmission device. The optical fiber 11 has a cut-off wavelength of 1238 nm enabling single-mode transmission at a wavelength of 1250 nm. Besides, the optical fiber 11 has a bending loss of 0.6 dB/turn at a wavelength of 1310 nm when bent with a curvature radius of 1 mm, and a chromatic dispersion value of 1.04 ps/nm/km at a wavelength of 1310 nm. Thus, the optical fiber 11 can be preferably used for an optical fiber ribbon having a small bending loss and high installation efficiency.

The cut-off wavelength in this description is a fiber cut-off wavelength λc defined by ITU-T G.650.1. Unless otherwise specified, other terms in the description also follow definition and measuring method defined by ITU-T G.650.1.

The refractive index differences Δ1 and Δ2 are defined, respectively, by Equations (1) and (2) as follows:

$$\Delta 1 = \{(n_{c1} - n_c)/n_c\} \times 100 [\%] \quad (1)$$

$$\Delta 2 = \{(n_{c2} - n_c)/n_c\} \times 100 [\%] \quad (2)$$

where $n_{c1}$ is a maximum refractive index of the center core 111a, $n_{c2}$ is a minimum refractive index of the depressed core layer 111b, and $n_c$ is a refractive index of the cladding layer 111c.

In the W-shaped refractive-index profile, the diameter a of the center core 111a is determined so that a refractive index at the border between the center core 111a and the depressed core layer 111b is equal to that of the cladding layer 111c, and the outer diameter b of the depressed core layer 111b is determined so that a refractive index difference at the border between the depressed core layer 111b and the cladding layer 111c is half the refractive index difference Δ2.

The parameter a is defined by Equation (3) as follows:

$$n^2(r) = n_{c1}^2 \times \{1 - 2 \times (\Delta/100) \times (2r/a)^\alpha\} \text{(where } 0 < r < a/2) \quad (3)$$

where r is a position in a radial direction from the center of the optical fiber, n(r) is a refractive index at the position r, and a symbol "^" denotes exponentiation.

The optical fiber ribbon 10 is manufactured in the following manner. First, a preform, which is mainly made of fused silica, is drawn by heating and melting it in a drawing furnace to obtain a fused-silica optical fiber. The fused-silica optical fiber is then coated with a liquid ultraviolet curable resin using coating dies. The ultraviolet curable resin is irradiated with ultraviolet rays and cured to form a fiber coating. Thus, an optical fiber is manufactured. Subsequently, 12 optical fibers thus manufactured are arranged in parallel and applied at the same time with a liquid ultraviolet curable urethane acrylate resin containing aluminum hydroxide. The applied resin is irradiated with ultraviolet rays and cured to form a ribbon coating. Thus, the optical fiber ribbon is obtained.

As explained above, according to the first embodiment, the fiber coating 112 is made of non-flame-resistant ultraviolet curable resin. Thus, favorable screening characteristics can be achieved while the optical fiber ribbon 10 has a small thickness H1 equal to 300 μm or less. In addition, the ribbon coating 12 has a thickness T1 equal to 40 μm or more and is made of flame resistant ultraviolet curable urethane acrylate resin containing aluminum hydroxide, which achieves favorable flame resistance. Although the glass optical fiber having a W-shaped refractive-index profile is described, by way of example and without limitation, in the first embodiment, a different type of optical fiber having a different refractive-index profile can also be adopted such as an optical fiber having a step-type profile or a multimode optical fiber.

Figure 4:
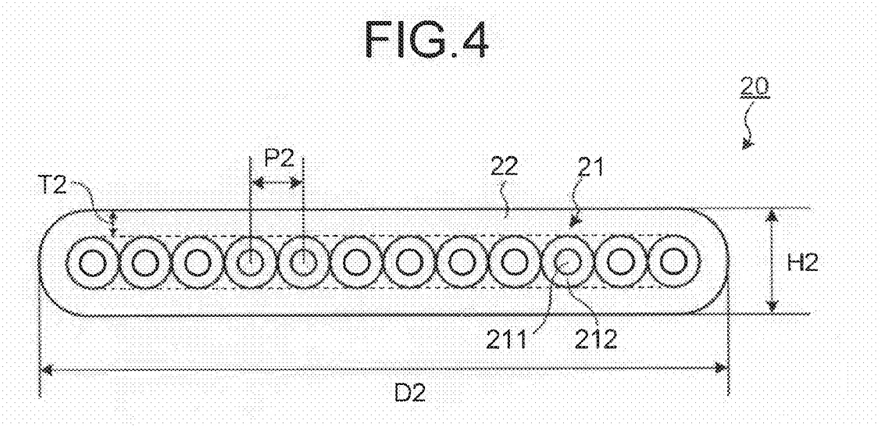
FIG. 4 is a schematic cross section of an optical fiber ribbon according to a second embodiment of the present invention.

FIG. 4 is a schematic cross section of an optical fiber ribbon 20 according to a second embodiment of the present invention. The optical fiber ribbon 20 is formed by arranging in parallel 12 optical fibers 21, each obtained by forming a fiber coating 212 on the circumference of a glass optical fiber 211, and by integrating the optical fibers 21 with a ribbon coating 22.

Figure 5:
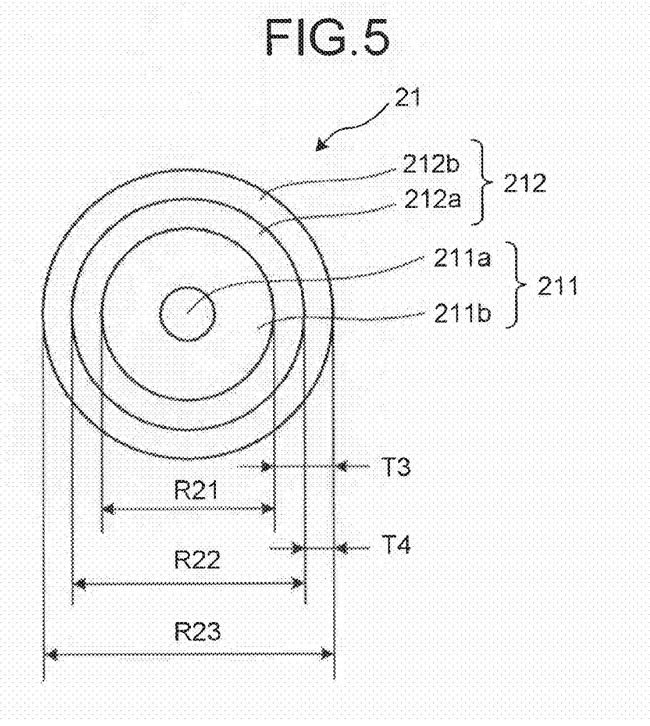
FIG. 5 is a cross section of an optical fiber shown in FIG. 4.

FIG. 5 is a cross section of the optical fiber 21. As with the optical fiber 11, the optical fiber 21 is obtained by forming the fiber coating 212 on the circumference of the glass optical fiber 211. The glass optical fiber 211 includes a center core 211a and a cladding layer 211b formed around the center core 211a, and is a single mode optical fiber having a normal step-type refractive-index profile. An outer diameter R21 of the glass optical fiber 211 is 125 μm.

The fiber coating 212 includes a non-flame-resistant layer 212a and a flame resistant layer 212b. The non-flame-resistant layer 212a adjacent to the glass optical fiber 211 has a Young's modulus of 40 kgf to 200 kgf, and is made of a non-flame-resistant ultraviolet curable urethane acrylate resin containing aluminum hydroxide as flame resistant agent. This protects the glass optical fiber 211 from external damage and enhances flame resistance of the optical fiber ribbon 20.

Figure 6:
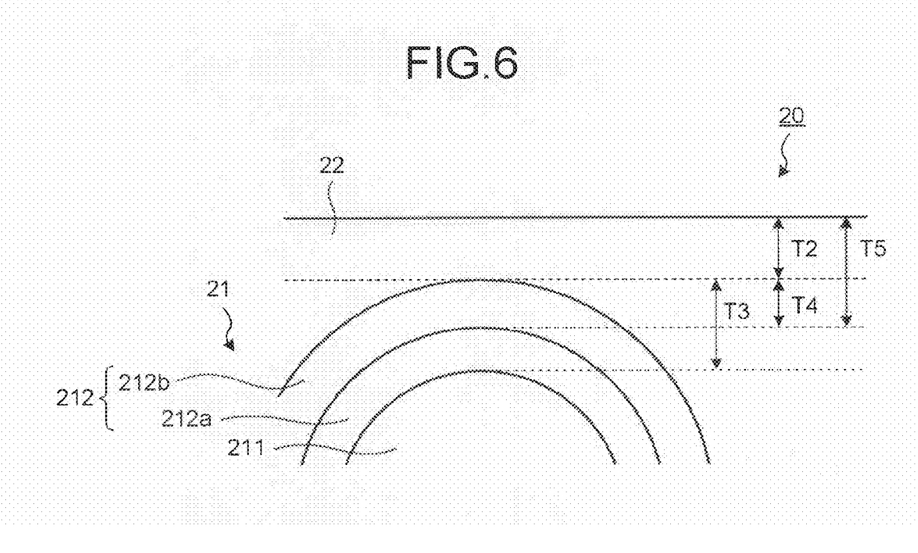
FIG. 6 is a diagram for explaining a relation between thicknesses of coatings of the optical fiber ribbon shown in FIG. 4.

FIG. 6 is an enlarged view of part of the optical fiber ribbon 20 for explaining the thickness of the coatings thereof. As shown in FIG. 6, a thickness T3 of the fiber coating 212, i.e., a total thickness of the non-flame-resistant layer 212a and the flame resistant layer 212b, is equal to 30 μm or more. Therefore, even if aluminum hydroxide coagulates into clumps in the manufacturing process, such clumps do not damage a surface of the glass optical fiber 211. Thus, the optical fiber 21 can achieve favorable screening characteristics. An outer diameter R22 of the non-flame-resistant layer 212a is 195 μm and an outer diameter of the flame resistant layer 212b, i.e., an outer diameter R23 of the optical fiber 21, is 250 µm.

The ribbon coating 22 is made of an ultraviolet curable urethane acrylate resin containing aluminum hydroxide as flame resistant agent. A total thickness T5 of a thickness T2 of the ribbon coating 22 and a thickness T4 of the flame resistant layer 212b is equal to 40 µm or more. Thus, even if each of the ribbon coating 22 and the flame resistant layer 212b has a thickness smaller than 40 µm, the optical fiber ribbon 20 can achieve favorable flame resistance.

The optical fiber ribbon 20 has a small thickness H2 equal to 40 µm or less. A pitch P2 between the optical fibers 21 is 250 µm and a width D2 of the optical fiber ribbon 20 is equal to that of a conventional optical fiber ribbon. Thus, it is possible to maintain compatibility with the conventional fiber ribbon as well as to increase flexibility of wiring and installation efficiency in a transmission device. Thus, space saving can be achieved.

The optical fiber ribbon 20 can be manufactured in the same manner as previously explained for the optical fiber ribbon 10 except for a process for forming the non-flame-resistant layer and the flame resistant layer.

As explained above, according to the second embodiment, the optical fiber ribbon 20 has the small thickness H2 equal to 300 µm or less. The fiber coating 212 has the thickness T3 equal to 30 µm or more and includes the non-flame-resistant layer 212a adjacent to the glass optical fiber 211 and the flame resistant layer 212b formed as an outermost layer thereof. Thus, the optical fiber ribbon 20 can achieve favorable screening characteristics while having the flame resistant layer 212b in the fiber coating 212. In addition, the ribbon coating 22 is made of a flame resistant resin and the total thickness T5 of the flame resistant layer 212b and the ribbon coating 22 is equal to 40 µm or more. Thus, favorable flame resistance can be achieved.

Although the glass optical fiber having the step-type refractive-index profile is described, by way of example and without limitation, in the second embodiment, a different type of optical fiber having a different refractive-index profile can be adopted such as a multimode optical fiber.

Figure 7:
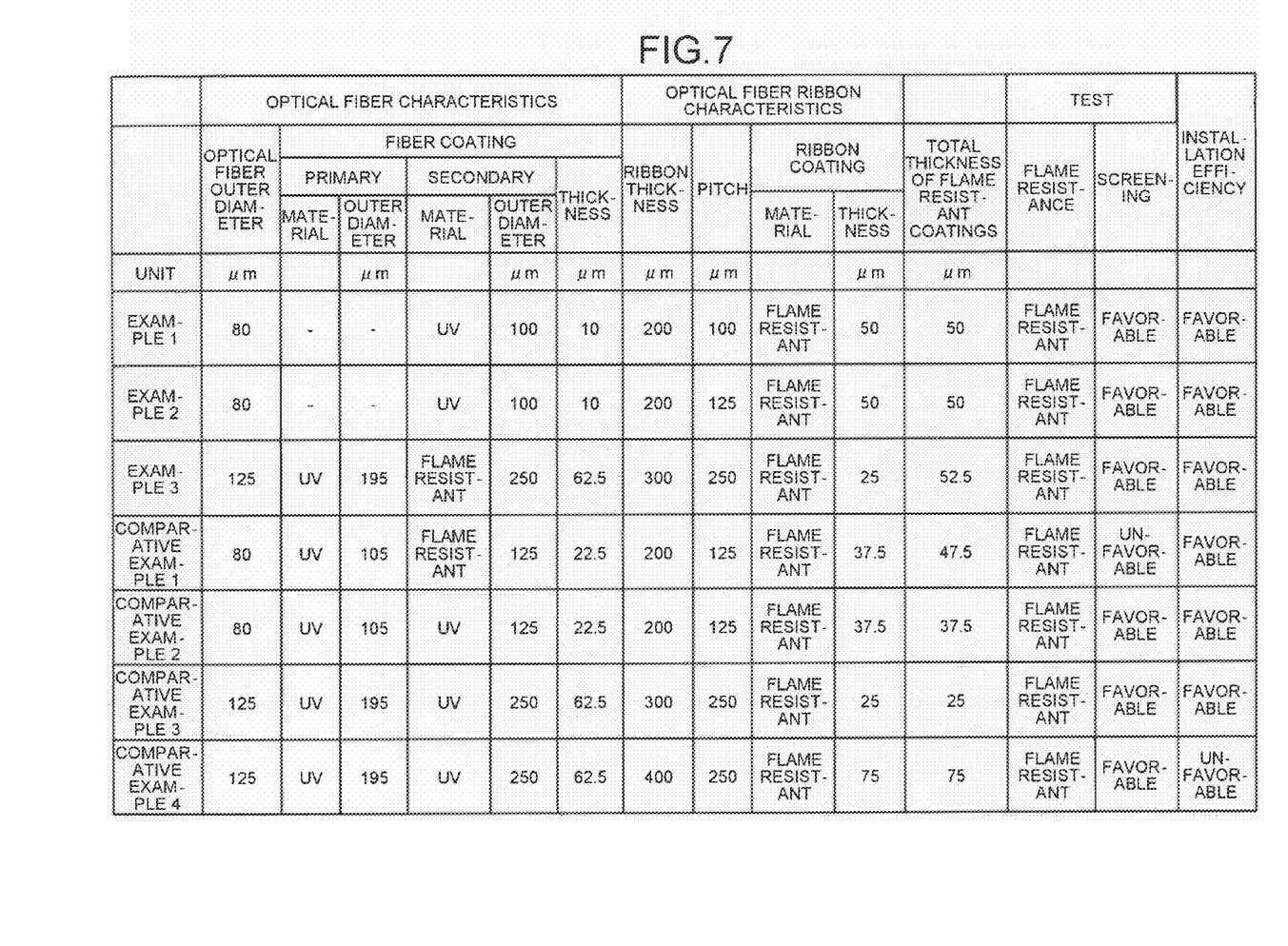
FIG. 7 is a table of results of flame test and screening test conducted on examples of optical fiber ribbons of the embodiments and comparative examples.

Optical fiber ribbons were manufactured as Examples 1 to 3 of the embodiments and Comparative Examples 1 to 4. FIG. 7 is a table of results of flame test and screening test conducted on Examples and Comparative Examples.

In FIG. 7, a single-layer fiber coating of the optical fiber ribbons of Examples 1 and 2 are represented as "SECONDARY", and non-flame-resistant layers and flame resistant layers of the fiber coatings of Example 3 and Comparative Examples 1 to 4 are respectively represented as "PRIMARY" and "SECONDARY". In addition, "UV" represents a non-flame-resistant ultraviolet resin and "FLAME RESISTANT" represents a flame resistant ultraviolet curable urethane acrylate resin containing aluminum hydroxide. The resin used for "PRIMARY" has a Young's modulus of 0.15 kgf to 0.2 kgf, and the resin used for "SECONDARY" has a Young's modulus of 40 kgf to 200 kgf. Besides, "TOTAL THICKNESS OF FLAME RETARDANT COATINGS" represents the thickness of "RIBBON COATING" of Examples 1 and 2 and Comparative Examples 2 to 4 and a total thickness of "SECONDARY" and "RIBBON COATING" of Example 3 and Comparative Example 1.

A flame test represented as "FLAME RESISTANCE" was conducted under UL1581-1080 (VW-1) standard. Results of the flame test performed on the optical fiber ribbon are represented as "FLAME RESISTANT" indicating that the optical fiber ribbon did not flame or "NON-FLAME-RESISTANT" indicating that the optical fiber flamed. A screening test represented as "SCREENING" was conducted on an optical fiber under the condition of a screening strain of 1%. Results of the screening test are represented as "FAVORABLE" indicating that an excellent optical fiber having a length equal to 1000 m or more was obtained or "UNFAVORABLE" indicating that an excellent optical fiber having a length equal to 1000 m or more was not obtained due to breakage. Regarding installation efficiency, "FAVORABLE" represents that the thickness of the optical fiber ribbon was 300 µm or less and "UNFAVORABLE" represents that the thickness of the optical fiber ribbon was more than 300 µm.

The optical fiber of Example 1 was the same as the one described in the first embodiment, and the optical fiber of Example 2 had the same W-shaped refractive-index profile as that of the first embodiment, i.e., $\Delta 1$ was 0.9%, $\alpha$ was 8.0, $\Delta 2$ was −0.5%, a was 6.7 µm, and b was 11.2 µm. The optical fiber was characterized in that a mode field diameter at a wavelength of 1310 nm was 5.5 µm, a cut-off wavelength was 1236 nm, a bending loss at a wavelength of 1310 nm when the optical fiber is bent with a curvature radius of 1 mm was 0.3 dB/turn, a chromatic dispersion value was 0.25 ps/nm/km. Furthermore, the optical fiber of Example 3 was a single mode optical fiber having the same normal step-type refractive-index profile as that of the second embodiment.

On the other hand, the optical fibers of Comparative Examples 1 and 2 each had the same W-shaped refractive-index profile as that of the first embodiment, in which $\Delta 1$ is 1.2% and $\alpha$ is 1.5, $\Delta 2$ is −0.2%, a is 7.8 µm, and b is 14.5 µm. The optical fiber was characterized in that a mode field diameter at a wavelength of 1310 nm was 5.5 µm, a cut-off wavelength was 1244 nm, a bending loss at a wavelength of 1310 nm when the optical fiber is bent with a curvature radius of 1 mm was 0.6 dB/turn, a chromatic dispersion value was −7.4 ps/nm/km. Furthermore, the optical fibers of Comparative Examples 3 and 4 each were a single mode optical fiber having the same normal step-type refractive-index profile as that of the second embodiment.

As shown in FIG. 7, the optical fiber ribbons of Examples 1 and 2 achieved favorable screening characteristics with the optical fiber that was coated with a fiber coating made of only "UV" and that was excellent as having a length equal to 1000 m or more. In addition, the flame resistant coating had a thickness of 50 µm, i.e., more than 40 µm, and thus, the optical fiber ribbons did not flame and represented favorable flame resistance. The optical fiber ribbons each had a small thickness of 200 µm in consideration of space saving and increase in transmission loss due to the thinner coating. In other words, the thickness was sufficiently small, and installation efficiency was favorable. In addition, the pitches between the optical fibers of Examples 1 and 2 were 100 µm and 125 µm, respectively. Thus, the widths of the optical fiber ribbons were about half of that of a conventional optical fiber ribbon, which significantly increases flexibility.

The optical fiber ribbon of Example 3 achieved favorable screening characteristics with the optical fiber that was coated with a fiber coating that had a thickness of 62.5 µm, i.e., more than 30 µm, while made of "UV" and "FLAME RESISTANT" and that was excellent as having a length of 1000 m or more. Although the ribbon coating had a thickness of 25 µm, "SECONDARY", i.e., the flame resistant layer, had a thickness of 27.5 µm, and thus, the total thickness of the flame resistant coatings is 52.5 µm, i.e., more than 40 µm. Thus, the optical fiber ribbon did not flame in the flame test and represented favorable flame resistance. In addition, the optical fiber ribbon had a thickness of 300 µm and favorable installation efficiency was achieved.

In the case of the optical fiber ribbon of Comparative Example 1, the optical fiber broke before the length thereof reached 1000 m in the screening test. The optical fiber ribbons of Comparative Examples 2 and 3 flamed in the flame test. The optical fiber ribbon of Comparative Example 4 had a thickness more than 300 μm and had unfavorable installation efficiency.

If the optical fiber of Example 1 has an outer diameter of 55 μm and the fiber coating has a thickness of 10 μm, a pitch between the optical fibers can be reduced to 75 μm, which further reduces the width of the optical fiber ribbon, and thus increases flexibility and installation efficiency of the optical fiber ribbon.

In the above embodiments, an ultraviolet curable urethane acrylate resin containing aluminum hydroxide is used as a flame resistant resin. Alternatively, an ultraviolet curable urethane acrylate resin containing aluminum magnesium hydroxide can be used.

If the fiber coating is a single layer coating, it is preferable that the optical fiber have a bending loss of 1 dB/turn or less at a wave length of 1310 nm when bent with a curvature radius of 1 mm. In consideration of connection with another optical fiber, it is preferable that a mode field diameter at a wavelength of 1310 nm be 5.4 μm or more. An optical fiber having the above characteristics can be achieved with, for example, a silica optical fiber having a W-shaped refractive-index profile, in which Δ1 is equal to 0.8% or more, a is equal to 1.5 or more, and Δ2 is equal to −0.2% or less.

As set forth hereinabove, according to an embodiment of the present invention, an optical fiber ribbon can achieve favorable screening characteristics as well as favorable flame resistance while having a small thickness equal to 300 μm or less.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber ribbon comprising:
    a plurality of optical fibers that are arranged in parallel, each optical fiber including a glass optical fiber coated with a fiber coating; and
    a ribbon coating that coats the optical fibers arranged in parallel, wherein
    the optical fiber ribbon has a thickness equal to 300 μm or less,
    the fiber coating includes a non-flame-resistant ultraviolet curable resin, and
    the ribbon coating has a thickness equal to 40 μm or more and includes a flame resistant resin.

2. The optical fiber ribbon according to claim 1, wherein the fiber coating is a single layer coating.

3. The optical fiber ribbon according to claim 1, wherein the optical fiber ribbon has a thickness equal to 200 μm or less.

4. The optical fiber ribbon according to claim 1, wherein the glass optical fiber has an outer diameter of 55 μm to 90 μm.

5. An optical fiber ribbon comprising:
    a plurality of optical fibers that are arranged in parallel, each optical fiber including a glass optical fiber coated with a fiber coating; and
    a ribbon coating that coats the optical fibers arranged in parallel, wherein
    the optical fiber ribbon has a thickness equal to 300 μm or less,
    the fiber coating has a thickness equal to 30 μm or more, and includes
        a non-flame-resistant layer that includes a non-flame-resistant ultraviolet curable resin and is adjacent to the glass optical fiber; and
        a flame resistant layer that is formed as an outermost layer and includes a flame resistant resin containing flame resistant agent,
    the ribbon coating includes a flame resistant resin, and
    a total thickness of the flame resistant layer and the ribbon coating is equal to 40 μm or more.

6. The optical fiber ribbon according to claim 5, wherein the optical fiber ribbon has a thickness equal to 200 μm or less.

7. The optical fiber ribbon according to claim 5, wherein the glass optical fiber has an outer diameter of 55 μm to 90 μm.

8. The optical fiber ribbon according to claim 1, wherein the glass optical fiber includes a center core, a depressed core layer formed around the center core, and a cladding layer formed around the depressed core layer.

9. The optical fiber ribbon according to claim 8, wherein a refractive index of the center core is higher than a refractive index of the depressed core layer and a refractive index of the cladding layer, and the refractive index of the cladding layer is higher than the refractive index of depressed core layer.

10. The optical fiber ribbon according to claim 9, wherein the center core has a diameter such that a refractive index at a border between the center core and the depressed core layer is equal to the refractive index of the cladding layer.

11. The optical fiber ribbon according to claim 9, wherein the depressed core layer has an outer diameter such that twice a refractive index difference at a border between the depressed core layer and the cladding layer equals Δ2, wherein $$\Delta 2 = [(n_{c2} - n_c)/n_c] \times 100 [\%], \text{where}$$

$n_{c2}$ is a minimum refractive index of the depressed core layer, and
$n_c$ is a refractive index of the cladding layer.

12. The optical fiber ribbon according to claim 5, wherein a pitch between the optical fibers is 250 μm.

13. The optical fiber ribbon according to claim 1, wherein the flame resistant resin includes aluminum hydroxide.

14. The optical fiber ribbon according to claim 5, wherein the flame resistant resin contains aluminum hydroxide.

15. The optical fiber ribbon according to claim 5, wherein the glass optical fiber includes a center core and a cladding layer formed around the center core.

* * * * *